United States Patent
Sharov et al.

(10) Patent No.: US 10,867,170 B2
(45) Date of Patent: Dec. 15, 2020

(54) SYSTEM AND METHOD OF IDENTIFYING AN IMAGE CONTAINING AN IDENTIFICATION DOCUMENT

(71) Applicant: AO Kaspersky Lab, Moscow (RU)

(72) Inventors: Alexander V. Sharov, Moscow (RU); Dmitry S. Dorogoy, Moscow (RU); Ilya A. Tereshchenko, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 91 days.

(21) Appl. No.: 16/150,722

(22) Filed: Oct. 3, 2018

(65) Prior Publication Data

US 2019/0303665 A1 Oct. 3, 2019

(30) Foreign Application Priority Data

Mar. 30, 2018 (RU) .............................. 2018111484

(51) Int. Cl.
*G06K 9/00* (2006.01)
(52) U.S. Cl.
CPC ..... *G06K 9/00456* (2013.01); *G06K 9/00228* (2013.01)
(58) Field of Classification Search
CPC combination set(s) only.
See application file for complete search history.

(56) References Cited

U.S. PATENT DOCUMENTS

| 8,194,933 | B2 | 6/2012 | Lei et al. |
| 8,520,908 | B2 | 8/2013 | Bladel et al. |
| 8,995,774 | B1 | 3/2015 | van Deventer et al. |
| 2002/0029232 | A1 | 3/2002 | Bobrow et al. |

(Continued)

FOREIGN PATENT DOCUMENTS

RU 2626661 C1 7/2017

OTHER PUBLICATIONS

Bulatov Konstantin et al: "Smart IDReader: Document Recognition in Video Stream",2017 14th IAPR International Conference on Document Analysis and Recognition (ICDAR), IEEE, vol. 6, Nov. 9, 2017 (Nov. 9, 2017), pp. 39-44.

(Continued)

*Primary Examiner* — Zhiyu Lu
(74) *Attorney, Agent, or Firm* — Arent Fox LLP; Michael Fainberg

(57) ABSTRACT

Disclosed herein are systems and methods for identifying images containing a personal identifying document. In one aspect, an exemplary method comprises obtaining a first set of images by selecting images from a stream of images in an arbitrary sequence, determining images in the first set of images that contain documents, generating a second set of images by excluding from the first set of images those images that do not contain documents, determining images in the second set of images that contain basic structural elements of an identification document, generating a third set of images by excluding from the second set of images those images which do not contain basic structural elements of an identification document and identifying from the generated third set of images, at least one image containing at least one identification document based on rules of determination.

27 Claims, 4 Drawing Sheets

(56) References Cited

U.S. PATENT DOCUMENTS

| | | | |
|---|---|---|---|
| 2007/0016790 A1* | 1/2007 | Brundage | B42D 25/23 |
| | | | 713/176 |
| 2009/0152357 A1 | 6/2009 | Lei et al. | |
| 2014/0156665 A1* | 6/2014 | Kraley | G06F 16/285 |
| | | | 707/739 |
| 2014/0314319 A1* | 10/2014 | Hamel | G06K 9/00993 |
| | | | 382/176 |
| 2015/0078671 A1* | 3/2015 | van Deventer | G06K 9/00463 |
| | | | 382/217 |
| 2015/0339526 A1 | 11/2015 | Macciola et al. | |
| 2016/0092730 A1 | 3/2016 | Smirnov et al. | |
| 2017/0286764 A1 | 10/2017 | Ma et al. | |
| 2018/0089533 A1 | 3/2018 | Lagaynov et al. | |
| 2018/0147645 A1* | 5/2018 | Boccadoro | B23H 11/00 |
| 2019/0019052 A1* | 1/2019 | Pao | G06K 9/3258 |

OTHER PUBLICATIONS

Sergey Usilin et al: "Visual appearance based document image classification", 2010 17th IEEE International Conference on Image Processing (ICIP 2010); Sep. 26-29, 2010.

Simon Marcel et al: "Fine-grained classification of identity document types with only one example", 2015 14th IAPR International Conference OnMachine Vision Applications (MVA), MVA Organization, May 18, 2015 (May 18, 2015), pp. 126-129.

\* cited by examiner

SYSTEM AND METHOD OF IDENTIFYING AN IMAGE CONTAINING AN IDENTIFICATION DOCUMENT

CROSS REFERENCE TO RELATED APPLICATIONS

This application claims benefit of priority under 35 U.S.C. 119(a)-(d) to a Russian Application No. 2018111484, filed Mar. 30, 2018, the entire contents of each of which are incorporated herein by reference.

FIELD OF TECHNOLOGY

The present disclosure relates to the field of preventing loss of information, and more specifically, systems and methods of identifying documents containing personal information in images.

BACKGROUND

The amount of information being transmitted through data transmission channels is constantly increasing. One of the reasons for this increase may be the increase in dimensions (i.e., pixel count) of graphic format files containing various images, such as photographs. The increasing of the dimensions is occurring from a desire to increase the volume and improve the quality of the images.

Improving the quality of an image enables a greater level of detail for the objects in the image. The greater level of detail might also be utilized by criminals for their own purposes. For example, an object containing personal data of other persons such as a page of a passport or driver's licenses might accidentally get into the frame of a photograph or a video recording. The high level of detail of the object might allow the captured document containing personal data to be read, which might be used by a criminal.

Presently, a number of solutions exist for the analyzing of photographs or scanned images of documents for the purpose of identity recognition. However, the known solutions are often unhelpful when analyzing images about which it is not precisely known whether or not any personal information exists in the images. Aspects of the present disclosure enables an effective solving of this problem.

SUMMARY

Aspects of the disclosure relate to the field of preventing loss of information, more specifically, systems and methods of identifying images containing personal identifying documents. The technical result of the present disclosure consists in preventing the use of personal data from identification documents when transmitting images. The technical result is achieved by identifying images which contain an identification document.

In one exemplary aspect, a method is provided for identifying an image containing a personal identifying document, wherein the method comprises obtaining, by a hardware processor, a first set of images by selecting images from a stream of images in an arbitrary sequence, determining images in the first set of images that contain documents by performing a first set of image processing algorithms on the first set of images, generating a second set of images by excluding from the first set of images those images that do not contain documents, determining images in the second set of images that contain basic structural elements of an identification document by using cascades of signs of a second set of image processing algorithms that search for regions containing the basic structural elements of an identification document, generating, by a hardware processor, a third set of images by excluding from the second set of images those images which do not contain basic structural elements of an identification document and identifying, by a hardware processor, from the generated third set of images, at least one image containing at least one identification document based on rules of determination.

In another exemplary aspect of the method, images not containing a document are identified as those images not containing structural elements of a document common to typical documents.

In yet another exemplary aspect of the method, the structural elements of a document comprise one or more: a document background and document text, and wherein detecting the structural document comprises detecting a small region in an image containing the document background having no characters or data therein.

In another exemplary aspect of the method, the structure element of a document which is common to typical documents is at least one of: a background of hues of light color, text of dark color.

In yet another exemplary aspect of the method, the structure element of an identification document is at least one of: a facial image, the flag of a country or region, the seal of a governmental office, text including the name of a section of an identification document.

In yet another exemplary aspect of the method, those documents are identified that contain personal data.

In yet another exemplary aspect of the method, the personal data comprises information relating directly or indirectly to a determined or determinable physical person.

In yet another exemplary aspect of the method, the identifying images which do not contain documents comprises performing object search algorithms based on computer vision.

In yet another exemplary aspect of the method, the object search algorithms comprise one of OpenCV and Local Binary Pattern algorithm.

According to one aspect of the disclosure, a system is provided for identifying images containing a personal identifying document comprising a hardware processor configured to obtain a first set of images by selecting images from a stream of images in an arbitrary sequence, determine images in the first set of images that contain documents by performing a first set of image processing algorithms on the first set of images, generate a second set of images by excluding from the first set of images those images that do not contain documents, determine images in the second set of images that contain basic structural elements of an identification document by using cascades of signs of a second set of image processing algorithms that search for regions containing the basic structural elements of an identification document, generate a third set of images by excluding from the second set of images those images which do not contain basic structural elements of an identification document and identify from the generated third set of images, at least one image containing at least one identification document based on rules of determination.

In one exemplary aspect, a non-transitory computer-readable medium is provided storing instructions thereon for identifying an image containing a personal identifying document, wherein the instructions comprise obtaining a first set of images by selecting images from a stream of images in an arbitrary sequence, determining images in the first set of images that contain documents by performing a first set of image processing algorithms on the first set of images, generating a second set of images by excluding from the first set of images those images that do not contain documents, determining images in the second set of images that contain basic structural elements of an identification document by using cascades of signs of a second set of image processing algorithms that search for regions containing the basic structural elements of an identification document, generating a third set of images by excluding from the second set of images those images which do not contain basic structural elements of an identification document and identifying from the generated third set of images, at least one image containing at least one identification document based on rules of determination.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for identifying images containing personal identifying documents. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In the general instance, a document is a physical medium with information registered on it in any given form appearing as text, an audio recording, an image and (or) a combination of these, having the prerequisites allowing it to be identified, and intended for transmittal in time and in space for purposes of public usage and storage.

An identification document is a special kind of document allowing a verification of the identity of the bearer of the document and containing personal data (http://enacademic-.com/dic.nsf/enwiki/211576). The list of documents verifying identity is open and updatable.

Figure 1:
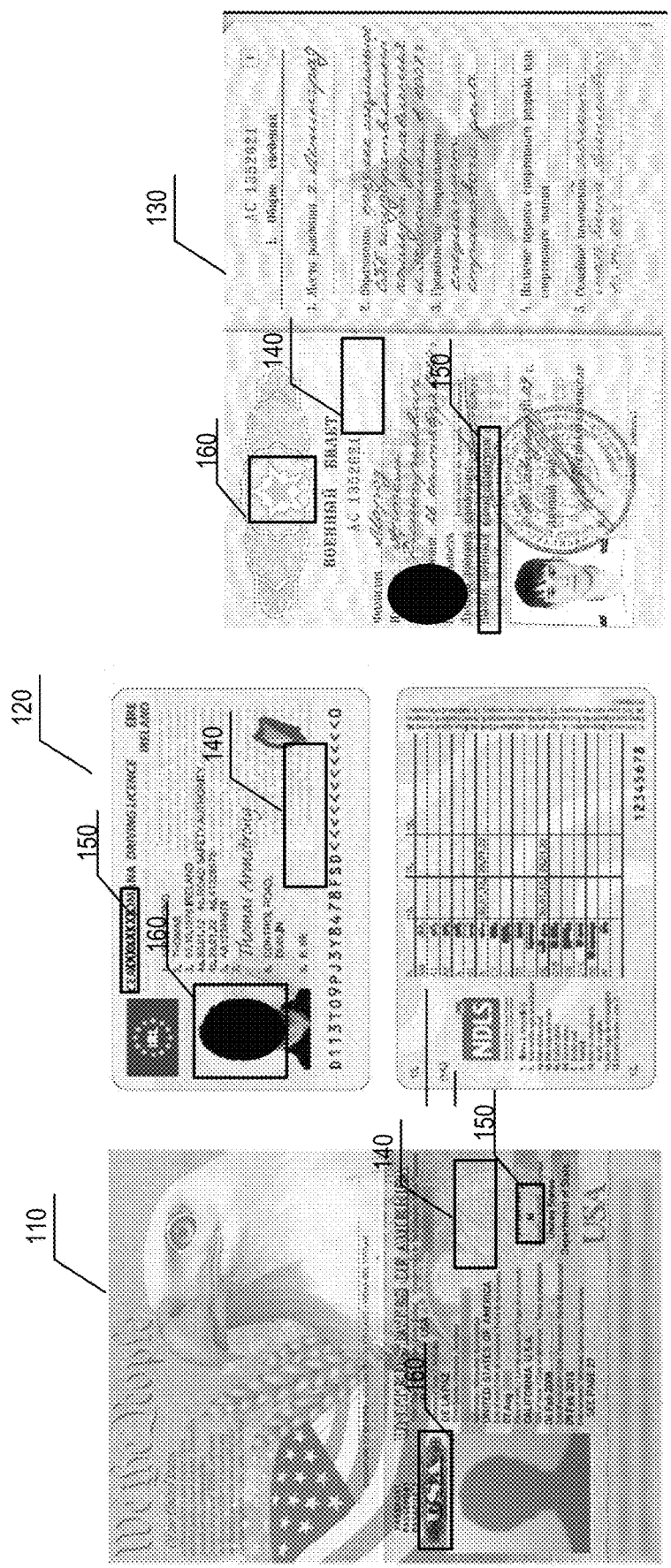
FIG. 1 illustrates examples of images of identification documents.

Personal data is any information relating directly or indirectly to a determined or determinable physical person (the subject of the personal data) (Federal Act of Jul. 27, 2006 N 152-FZ (version of Feb. 22, 2017) "On personal data");

An image refers to a digital numerical representation of a collection of pixels in a two-dimensional system of coordinates, stored in a graphical file format. FIG. 1 illustrates examples of images of identification documents, in particular a passport 110, driver's licenses 120 or a military ID 130.

There are a number of organizations which use images for identification, authentication and confirmation of the actions of the user. One example of a situation in which there arises a danger of obtaining unauthorized access to personal data is a "selfie" photograph with an identification document. In this situation, the bearer shows his or her face to confirm the legitimacy of the identification document represented in the photograph. A criminal, having gained access to this photograph, for example by intercepting its transmittal with the use of a smartphone, may obtain unauthorized access to another's personal data and use this unbeknownst to the owner for the criminal's own purposes. In order to prevent such a situation from arising, it is necessary to identify images containing identification documents using methods and systems described in this disclosure.

Figure 2:
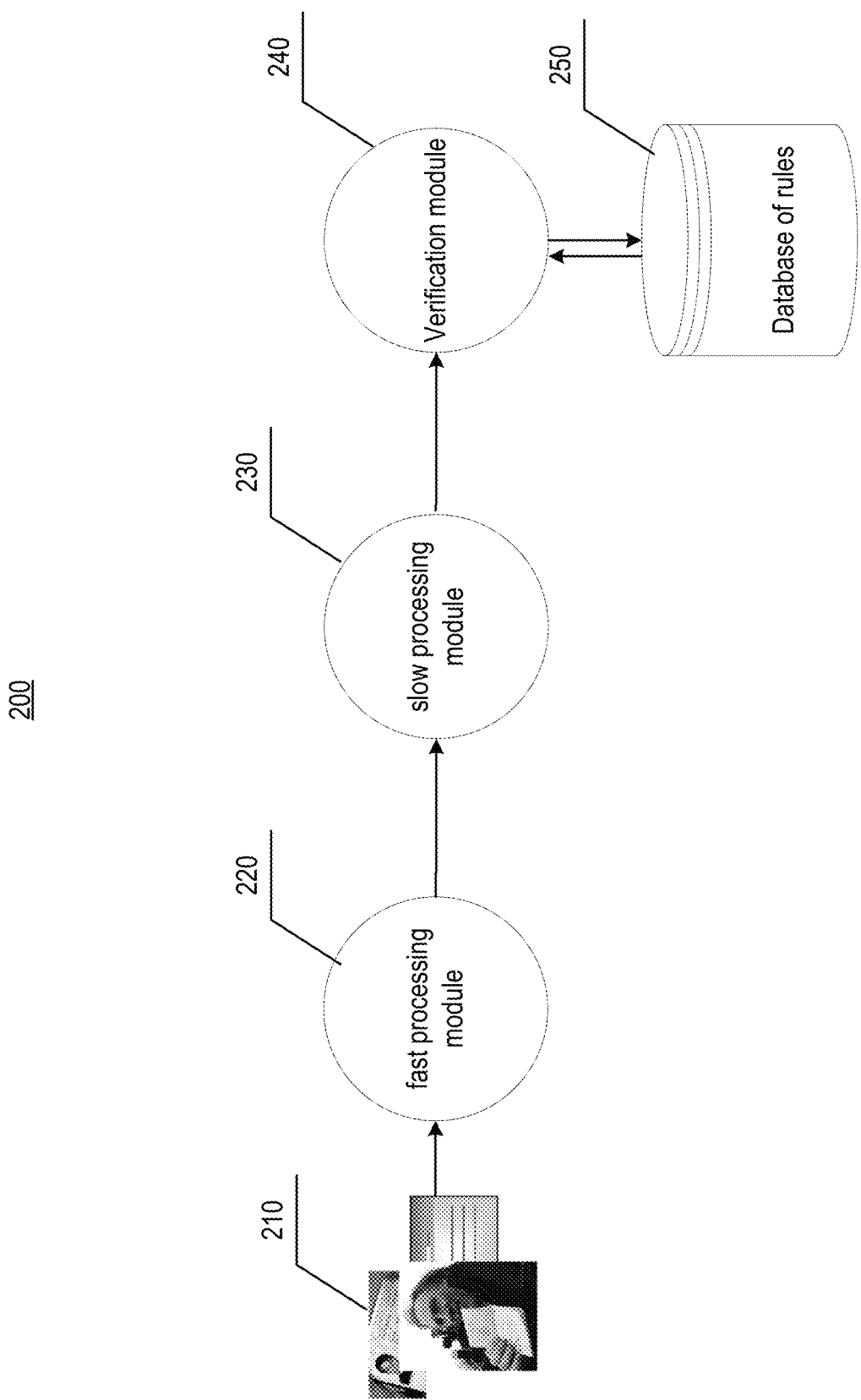
FIG. 2 illustrates the system of identifying images containing an identification document in accordance with exemplary aspects of the present disclosure.

FIG. 2 illustrates a system 200 for identifying an image containing an identification document. The system for identifying an image containing an identification document 210 comprises a fast processing module 220, a slow processing module 230, a verification module 240 and a database of rules 250.

According to one aspect of the disclosure, the fast processing module 220 may obtain a first set of images 210, in order to generate a second set of images. The fast processing module 220 performs algorithms which are able to process images faster than a predetermined rate of processing and excludes those images not containing a document from the first set of images. Subsequently, the fast processing module 220 transfers the generated second set of images to the slow processing module 230.

A stream of images is an array of images being transmitted by a network or stored in the memory of a computer system which a user is using. The first set of images 210 may be obtained by the fast processing module 220 by picking out images from a stream of images in arbitrary sequence and generating the first set of images from them.

According to one aspect of the disclosure, the second set of images may be generated by the fast processing module 220 by excluding those images not containing any documents from the first set of images.

In this disclosure, images that do not contain one or more documents are considered, in one aspect, to be images not containing structural elements of a document common to typical documents, such as a document background (a background of hues of light color, or a specialized document background) and document text (usually of black or blue color). Image processing algorithms and libraries are used to check for the presence of such structural elements of documents to determine if a document is found in the image.

The presence of a structural element such as a document background may be confirmed by detecting a small region of the image containing a particular color or shade of color confirming that a document background 140 is found, having no characters or data therein. The small region of the image containing the document background 140 may be used as an object of a search and may be detected in the image by the use of object search algorithms, such as those based on the computer vision library with open code OpenCV (http://opencv.org/). The Local Binary Pattern algorithm (LBP, http://media.cs.tsinghua.edu.cn/~ahz/papers/ICB07_demographic.pdf) is sufficiently fast in its working and after teaching is able to sort through a large volume of images, discarding those not containing the sought object.

The presence of a structural element such as document text may be confirmed by detecting a region of the image containing text 150. The region of the image containing text 150 may be detected by using a text region search algorithm, such as Stroke Width Transform (http://www.math.tau.ac.il/~turkel/imagepapers/text_direction.pdf). The region of the image containing text 150 should be in the immediate vicinity of the region of the image containing the document background 140. Thus, there is no need to employ algorithms to search for regions of text throughout the entire image being analyzed.

Thus, images containing photographs of landscapes, animals, and so on are excluded from the first set of images. Then the fast processing module 220 sends a second set of images to the slow processing module 230, wherein the second set of images contains all images from the first set of images except those that are excluded.

The slow processing module 230 is designed to generate a third set of images by excluding from the second set of images those images not containing the basic structural elements of an identification document. The third set of images is than transmitted to the verification module 240. Since the objects that need to be recognized (e.g., structural elements of an identification document) are more complex than simple backgrounds and text identified by the fast processing module 220, the algorithms for recognizing the objects are slower than the algorithms used by the fast processing module 220. In the previous stage of fast processing, the fast processing module 220 searched for a single-tone image area and text, while at this stage the slow processing module 230 recognizes faces, seals, coat of arms, flags and the like, not recognizable by so-called "fast algorithms".

A basic structural element of an identification document is an element that is encountered and is characteristic of primarily identification documents. Basic structural elements of an informational document may be a facial image of a given format, the flag of a country or region, of the place where the document was issued, conventional symbols characteristic of a specific type of document, the seal of a governmental office, text including the name of a particular section of a document of special kind or in a special font, and so forth.

Images not containing a basic structural element of an identification document are identified and excluded by, according to one aspect, using cascades of features (alternatively referred to as signs) of slow image processing algorithms taught to search for regions of an image containing a basic structure element of an identification document 160.

According to one aspect of disclosure, the features of an image is the most elementary distinguishing characteristic or attribute of the image. Certain features are natural features in the sense that they are established by visual analysis of the image, while others, so-called artificial features, are obtained as a result of special processing or measurements of the image. Natural features include the brightness and texture of different regions of the image, the shape of the contours of objects, and so forth. (Pratt U. Digital image processing, translated from the English, M: Mir, 1982.—Vol. 2—480 pp., http://sernam.ru/book_prett2.php).

A number of features exist which may be used to search for the required images, such as the features of a digital image constructed on the basis of the Q-found as Viola-Jones algorithm online algorithm (Haar features, http://docs.opencv.org/trunk/d7/d8b/tutorial_py_face_detection-.html), constructed on the basis of the Histogram of Oriented Gradient (HOG) algorithm (http://www.learnopencv.com/histogram-of-oriented-gradients/).

Thus, the images containing those documents which are not identification documents are excluded from the second set. These documents may include photographs of handwritten letters, printed text documents, pages from books, and so on. Then the slow processing module 230 transmits the generated third set of images to the verification module 240.

According to an aspect of the disclosure, the verification module 240 may identify, on the basis of rules of determination, those images which contain an identification document from the generated third set of images.

According to one aspect, images which contain an identification document are identified by using "super" slow image processing algorithms, neural nets, and rules of determination. These algorithms are considered "super" slow because they are used to detect or recognize one or more complex objects, relative positions and rotations relative to each other, and they may process images at a longer rate than other algorithms that process simple objects, shapes and text.

In one aspect, rules of determination comprise a set of conditions that, when fulfilled by an image, the image from the third set of images is considered to contain, or be, an identification document. Each image from the third set may, with a probability higher than a predetermined threshold (e.g., 70%), contain a region of the image containing a background 140, a region of the image containing text 150, and at a minimum one region of the image containing a basic structural element of an identification document 160. In the general case, rules of determination constructed for types of documents regardless of country will be sufficient for identifying an image containing an identification document. For example, one example of a rule of determination for identifying an identification document of passport type may be the following set of conditions: the presence of a document background of light shades of any given color, the presence of text determining the "gender" section, the presence of a basic element in the form of a flag or symbol of the country having issued the identification document, the presence of a facial photograph of the owner of the identification document or the like.

The identification documents of a particular type which are issued in different regions may have both similar basic structural elements, such as a facial photograph, and different basic structural elements characteristic of the issuing region, such as the flag of a country, a watermark or a graphic symbol. For such cases, rules of determination may be created for individual types of identification documents. For example, the mandatory presence of a flag may be added to the rule for determination of a driver's license.

One example of a rule of determination of a passport of a citizen of the USA may be the following set of conditions: the finding of a document background of light blue hue, the text of black color "Passport No", the watermark USA in the border, and the facial photograph of the owner. In this example, if this set of conditions is fulfilled, the image being analyzed is considered to be the passport of a citizen of the USA and, consequently, an identification document.

Another rule for the determination of an identification document may contain the necessity of fulfilling the following conditions: the presence of a background of light blue hue passing into light purple hue, the text of blue color "ceadúnas tiomána", the facial photograph of the owner of the document, the flag of the European Union with the inscription of white color "IRL" on the inside.

The rules of determination are created by analyzing images containing an identification document of a certain type. For example, the analysis of a thousand documents will make it possible to identify similar (containing data about the owner) and unchanging (containing document sections, such as last name) regions of the images. Analysis of the unchanging regions of an image of a military ID of the Russian Federation makes it possible to create the following set of conditions: the presence of a background of light orange spectrum, the text of black colored hues "Issued by the Military Commissariat", a watermark in the form of an orange star in a special frame. If these conditions are met, the analyzed image is recognized as a military ID of the Russian Federation, which is an identification document.

In the same way, rules of determination may be created for cases of working under conditions of poor image quality, for example, absence of color, sharpness, reduced brightness, and so on.

The database of rules 250 is designed to store the rules of determination. Different kinds of database may be used as the database of rules 250, namely hierarchical (IMS, TDMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J), functional, and so on.

Figure 3:
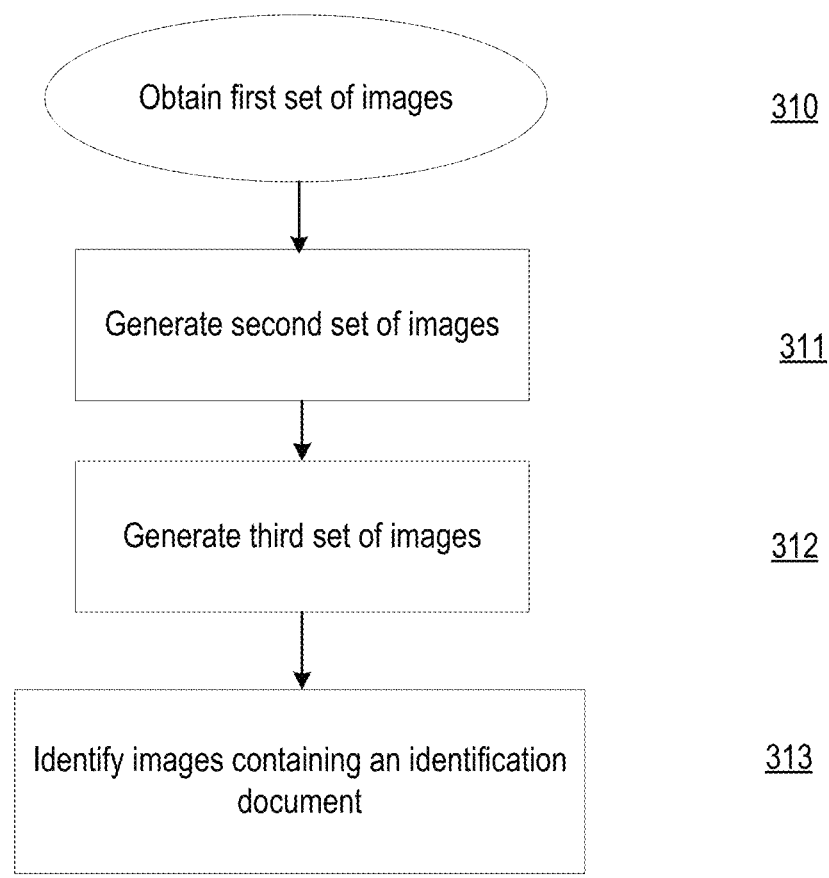
FIG. 3 illustrates the working algorithm of the system of an image containing an identification document in accordance with exemplary aspects of the present disclosure.

FIG. 3 illustrates the algorithm for the working of the system for identifying an image containing an identification document. In step 310, the fast processing module 220 obtains the first set of images 210. In step 311, the fast processing module 220 generates the second set of images by excluding from the first set of images those images not containing documents, and sends the generated second set to the slow processing module 230. In step 312, the slow processing module 230 generates the third set of images by excluding from the second set of images those images not containing the basic structure elements of an identification document and sends the generated third set to the verification module 240. In step 313 the verification module 240 identifies those images which contain an identification document from the generated third set of images on the basis of the rules of determination 250.

Figure 4:
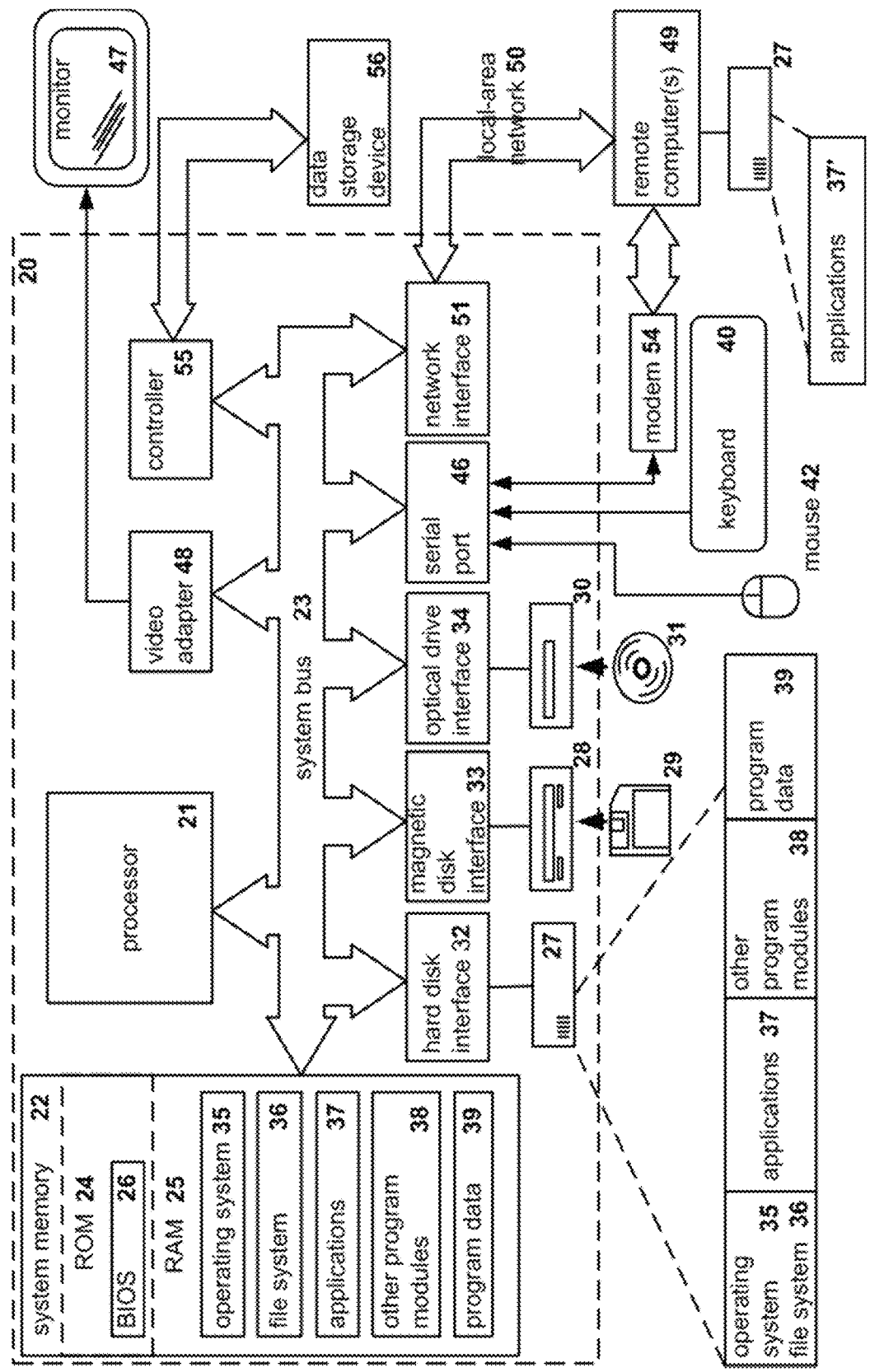
FIG. 4 represents an example of a general-purpose computer system, a personal computer or a server in accordance with exemplary aspects of the present disclosure.

FIG. 4 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for identifying images of personal identification documents, comprising:
   obtaining, by a hardware processor, a plurality of images associated with a user;
   identifying, by the hardware processor, in each of the images a plurality of structural elements that are characteristic to personal identification documents, including:
      applying a fast image search algorithm utilizing a computer vision library to identify images that contain a specific background characteristic to personal identification documents, including a single-tone area having no characters or data therein;
      applying a fast text search algorithm to the images containing the specific background to identify specific text formats characteristic to personal identification documents;
      applying a cascade of features of one or more slow image search algorithms to exclude, from the images containing both the specific background and specific text format, images not containing user's photo and government or state insignia, wherein the slow object search algorithm is configured to analyze natural and artificial features of the image;
   verifying, by the hardware processor, whether one or more remaining images are personal identification documents of the user using a plurality of verification rules specifying required structural elements of different types of known official personal identification documents, by checking whether the plurality of identified structural elements of each image match the required structural elements of any type of the known official personal identification document.

2. The method of claim 1, wherein the fast image search algorithm taught to identify images that contain the specific background characteristic is further taught to detect a small region in the images containing a particular color or a shade of color.

3. The method of claim 2, wherein the fast text search algorithm taught to identify specific text formats characteristic is further taught to search for a region containing text in a vicinity of the small region containing document background.

4. The method of claim 1, wherein the natural features of the image comprise brightness and texture of different regions of the image and shape of contours of objects in the image, and wherein the artificial features are constructed using at least Q-Found algorithm or histogram of oriented gradient algorithm.

5. The method of claim 1, wherein the government or state insignia includes at least one of: a flag of a country or region, the seal of a governmental office, text including the name of a section of an identification document.

6. The method of claim 1, wherein the one or more slow image search algorithms are taught to detect or recognize one or more complex objects, relative positions and rotations relative to each other.

7. The method of claim 1, wherein the plurality of verification rules comprise a set of conditions that, when fulfilled by the image, identify the corresponding document as an identification document.

8. The method of claim 1, wherein the fast image search algorithm comprises an object search algorithm based on the computer vision library.

9. The method of claim 8, wherein the object search algorithm comprises OpenCV algorithm.

10. A system for identifying images of personal identification documents, comprising:
a hardware processor configured to:
obtain a plurality of images associated with a user;
identify in each of the images a plurality of structural elements that are characteristic to personal identification documents, including:
apply a fast image search algorithm utilizing a computer vision library to identify images that contain a specific background characteristic to personal identification documents, including a single-tone area having no characters or data therein;
apply a fast text search algorithm to the images containing the specific background to identify specific text formats characteristic to personal identification documents;
apply a cascade of features of one or more slow image search algorithms to exclude, from the images containing both the specific background and specific text format, images not containing user's photo and government or state insignia, wherein the slow object search algorithm is configured to analyze natural and artificial features of the image;
verify whether one or more remaining images are personal identification documents of the user using a plurality of verification rules specifying required structural elements of different types of known official personal identification documents, by checking whether the plurality of identified structural elements of each image match the required structural elements of any type of the known official personal identification document.

11. The system of claim 10, wherein the fast image search algorithm taught to identify images that contain the specific background characteristic is further taught to detect a small region in the images containing a particular color or a shade of color.

12. The system of claim 11, wherein the fast text search algorithm taught to identify specific text formats characteristic is further taught to search for a region containing text in a vicinity of the small region containing document background.

13. The system of claim 10, wherein the natural features of the image comprise brightness and texture of different regions of the image and shape of contours of objects in the image, and wherein the artificial features are constructed using at least Q-Found algorithm or histogram of oriented gradient algorithm.

14. The system of claim 10, wherein the government or state insignia includes at least one of: a flag of a country or region, the seal of a governmental office, text including the name of a section of an identification document.

15. The system of claim 10, wherein the one or more slow image search algorithms are taught to detect or recognize one or more complex objects, relative positions and rotations relative to each other.

16. The system of claim 10, wherein the plurality of verification rules comprise a set of conditions that, when fulfilled by the image, identify the corresponding document as an identification document.

17. The system of claim 10, wherein the fast image search algorithm comprises an object search algorithm based on the computer vision library.

18. The system of claim 17, wherein the object search algorithm comprises OpenCV algorithm.

19. A non-transitory computer-readable medium storing instructions thereon for identifying images of personal identification documents, the instructions comprising:
obtaining, by a hardware processor, a plurality of images associated with a user;
identifying, by the hardware processor, in each of the images a plurality of structural elements that are characteristic to personal identification documents, including:
applying a fast image search algorithm utilizing a computer vision library to identify images that contain a specific background characteristic to personal identification documents, including a single-tone area having no characters or data therein;
applying a fast text search algorithm to the images containing the specific background to identify specific text formats characteristic to personal identification documents;
applying a cascade of features of one or more slow image search algorithms to exclude, from the images containing both the specific background and specific text format, images not containing user's photo and government or state insignia, wherein the slow object search algorithm is configured to analyze natural and artificial features of the image;
verifying, by the hardware processor, whether one or more remaining images are personal identification documents of the user using a plurality of verification rules specifying required structural elements of different types of known official personal identification documents, by checking whether the plurality of identified structural elements of each image match the required structural elements of any type of the known official personal identification document.

20. The medium of claim 19, wherein the fast image search algorithm taught to identify images that contain the specific background characteristic is further taught to detect a small region in the images containing a particular color or a shade of color.

21. The medium of claim 20, wherein the fast text search algorithm taught to identify specific text formats characteristic is further taught to search for a region containing text in a vicinity of the small region containing document background.

22. The medium of claim 19, wherein the natural features of the image comprise brightness and texture of different regions of the image and shape of contours of objects in the image, and wherein the artificial features are constructed using at least Q-Found algorithm or histogram of oriented gradient algorithm.

23. The medium of claim 19, wherein the government or state insignia includes at least one of: a flag of a country or region, the seal of a governmental office, text including the name of a section of an identification document.

24. The medium of claim 19, wherein the one or more slow image search algorithms are taught to detect or recognize one or more complex objects, relative positions and rotations relative to each other.

25. The medium of claim 19, wherein the plurality of verification rules comprise a set of conditions that, when fulfilled by the image, identify the corresponding document as an identification document.

26. The medium of claim 19, wherein the fast image search algorithm comprises an object search algorithm based on the computer vision library.

27. The medium of claim 26, wherein the first set of image processing algorithm comprises OpenCV algorithm.

\* \* \* \* \*